Feb. 17, 1970
W. H. JONES
3,496,380
SOLID STATE CARBONATOR CONTROL
Filed Feb. 6, 1968
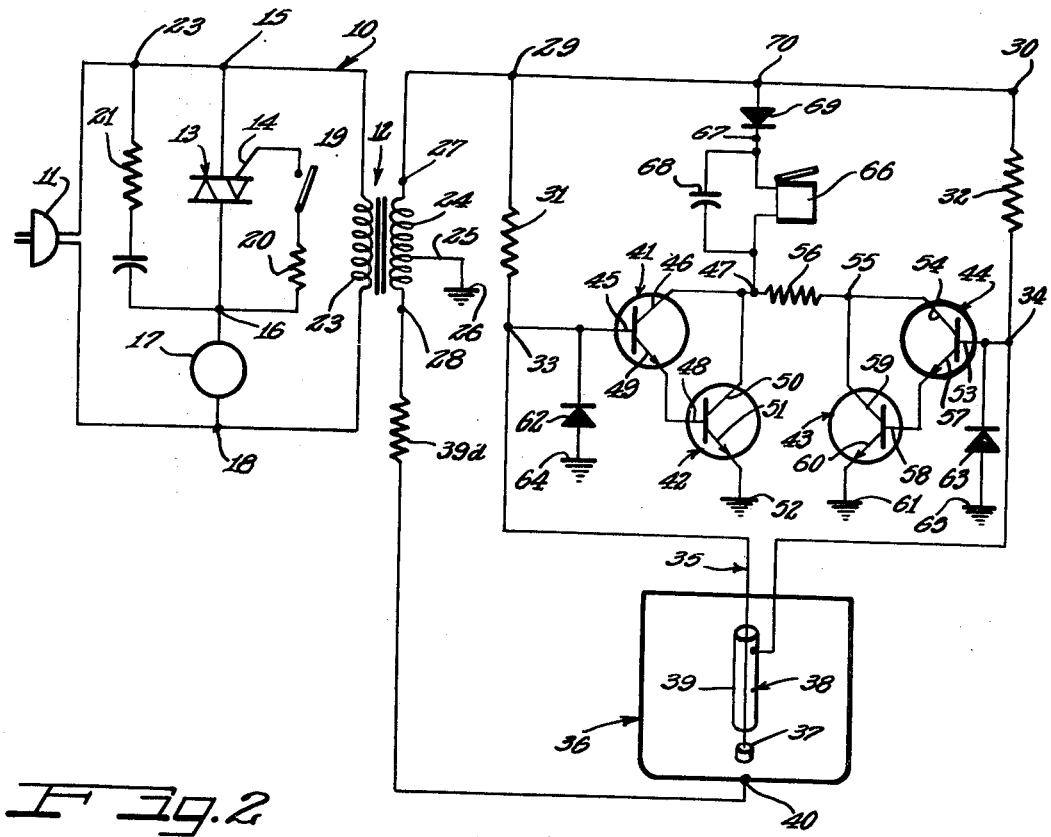
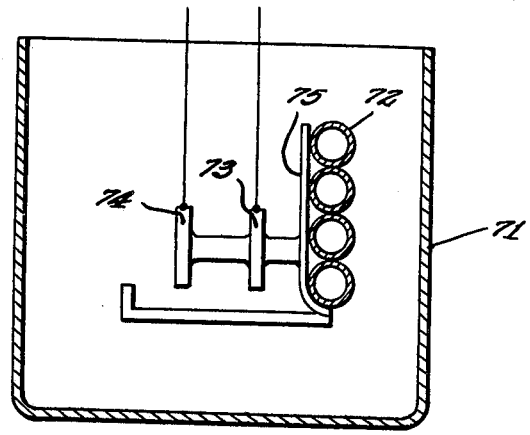
INVENTOR.
William H. Jones
BY *Hill, Sherman, Meroni, Gross & Simpson* ATTORNEYS

United States Patent Office 3,496,380
Patented Feb. 17, 1970

3,496,380
SOLID STATE CARBONATOR CONTROL
William H. Jones, Villa Park, Ill., assignor to The Dole Valve Company, Morton Grove, Ill., a corporation of Illinois
Filed Feb. 6, 1968, Ser. No. 703,465
Int. Cl. H01h 35/18, 35/24, 35/42, 45/00
U.S. Cl. 307—118                                7 Claims

ABSTRACT OF THE DISCLOSURE

A solid state control circuit for regulating the degree of build up of a substance within a container, such as the build up of the level of fluid within a container or the build up of ice at an ice bank. The control circuit has a relay which is operative to energize and deenergize a device such as a pump for adding liquid to the container or such as a compressor, the operation of which tends to increase the build up of ice at the ice bank. The relay is operative through first and second amplifier stages each of which is connected in series with the relay. The amplifier stages are connected in parallel with one another. A pair of voltage dividers are connected to the inputs of the amplifier stages respectively with one leg of each voltage divider consisting of a probe which is disposed within the container being sensed. Changes in impedance within the probe then turn "on" the respective amplifiers for actuating the relay. The impedance level of one of the amplifier stages significantly exceeds the impedance level of the other, and accordingly the relay may be "pulled in" by the operation of both amplifier stages only, but may be prevented from "dropping out" so long as either amplifier stage is conducting. Accordingly, a low-high level feature is obtained.

BACKGROUND OF INVENTION

Field of the invention

The field of art to which this invention pertains is a device for regulating the level of a substance within a container and in particular to a solid state device which actuates a relay to fill a container at one fluid level and which deactuates the relay for ceasing the filling action at another fluid level.

SUMMARY

It is an important feature of the present invention to provide a control circuit for regulating the degree of build up of a substance within a container.

It is another feature of the present invention to provide a control circuit for regulating the level of a medium within a container which circuit employs an improved low level and high level control feature.

It is an important object of the present invention to provide a solid state control circuit for regulating the level of fluid or degree of build up of a substance within a container.

It is another object of this invention to provide a dual probe controlled circuit having solid state switching means for actuating a device in response to a first degree of build up of substance within a container and for deactuating the device in response to a second degree of build up of substance within the container.

It is an additional object of the present invention to provide a device for controlling the degree of build up of substance within a container which includes a pair of amplifier stages and an associated pair of voltage dividers wherein each of the voltage dividers has one leg thereof disposed as an impedance probe for sensing the degree of build up of a substance within a container.

It is also an object of the present invention to provide a control circuit which includes a relay mechanism connected in series with first and second amplifier stages and wherein one of the amplifier stages has an additional impedance element connected therein to limit the current within the relay when said amplifier is placed in a connecting state.

These and other objects, features and advantages of the present invention will be understood in greater detail from the following description and the associated drawings wherein reference numerals are utilized to designate an illustrative embodiment.

BRIEF DESCRIPTION OF THE DRAWINGS

FIG. 1 is a schematic view of a control circuit of the present invention as utilized to regulate the level of liquid within a container, and FIG. 2 is a diagrammatic view of a typical ice bank control device which may be utilized in accordance with the present invention to control the degree of build up of ice therein.

DESCRIPTION OF THE PREFERRED EMBODIMENT

The electronic circuit of the present invention utilizes the variable impedance associated with a container experiencing a build up of substance therein. For instance, as water, carbonated water or other liquid increases or decreases its level within a container, the impedance developed between a probe, for instance, and the bottom wall of the container will vary in accordance with the level of liquid therein. As an example, the impedance of air is relatively high when compared to the impedance of a liquid such as water when measured between two points.

Accordingly, the changing impedance associated with the increasing level of liquid can be sensed in an electronic circuit for triggering a pump, valve, or other control device to increase or decrease the level of fluid within the container in accordance with a given requirement.

In a like manner, the build up of other substances within a container may also be controlled. For instance, it is undesirable to operate a cooling mechanism when excessive ice has developed about the cooling coils. Accordingly, it is desirable to automatically sense the build up of ice at the coils and to turn off the compressor when such build up becomes excessive to allow the ice to melt.

Utilizing the same principles as discussed above, the build up of ice within a fluid such as water, will cause a significant increase in impedance between probes disposed within the ice build up regions. This increase in impedance can be sensed by an appropriate circuit to deactivate the compressor to allow the ice build up to be eliminated.

It is apparent that it is desirable in either the case of a fluid or a solid, to sense the level of the build up of the substance at more than one point within the container. If the level of the fluid or the build up of the ice were sensed at only one point, the compressor or pump would be continuously oscillating between an on and off state. Accordingly, means must be provided to sense the level of the fluid, for instance, at a low level and to activate a pump in response thereto, but to deactivate the pump only after the fluid has attained a significantly higher level.

The present invention utilizes a pair of amplifier stages conected in parallel and arranged in series with a relay for sensing to build up of a substance at two levels within the container. Accordingly, the sensing circuit of the present invention in entirely solid state.

Specifically, the circuit shown in FIG. 1 includes a power source 10 which may be connected to a standard 115 volt supply line such as is shown at 11 and which has an output transformer 12.

A control circuit is provided for the power supply 10 and includes a triac 13 having a gate 14. The triac 13 has a first terminal 15 coupled to one side of the 115 volt supply line and a second terminal 16 coupled to a load 17. The load 17 has a terminal 18 coupled to the other side of the 115 volt supply line.

As will be well understood in the art, a triac functions in the nature of a bi-directional SCR. Essentially, a positive signal received at the gate 14 will allow the conduction of an AC signal between the terminals 15 and 16.

A switch 19 having a series resistor 20 is connected from the gate 14 to the terminal 16. A filter circuit which includes a resistor 21 and a series capacitor 22 is connected from a circuit junction point 23 to the junction point 16. Accordingly, the closing of the switch 19 will apply a positive signal to the gate 14 for turning on the triac 13.

An AC signal is applied across a primary winding 23 of the transformer 12. The transformer 12 has a secondary 24 with a center tap 25 connected to ground as at 26. Accordingly, the winding 24 has a first terminal 27 and a second terminal 28 which are referenced to ground at 26.

The terminal 27 of the winding 24 is coupled to a pair of voltage dividers which are utilized in the present invention to deliver the appropriate signal to a pair of ampliifier stages for turning on the relay which is utilized to energize the load 17. Essentially, the terminal 27 is coupled to a pair of terminals 29 and 30 which in turn are connected to resistors 31 and 32, respectively. The resistors 31 and 32 are then coupled to circuit junction points 33 and 34 which comprise the input points to the respective amplifier stages.

The remaining portion of the respective voltage dividers consist of the probes which are disposed within the container which holds the substance being regulated. In particular, the circuit junction point 33 is connected to a probe 35 which is disposed within a container 36. The probe 35 extends to a low point within the container as at 37.

In a similar manner, the circuit junction point 34 is connected to a second probe 38 which is also disposed within the container 36. The probe 38 extends to a level such as at 39 which is higher than the level 37 associated with the low level of the probe 35.

The second terminal of the transformer 12, namely the terminal 28 is coupled through a resistor 39 to a junction point 40 which is electrically identical with the wall of the container 36.

It is apparent, then, that a voltage divider is provided between the terminals 27 and 28 of the secondary winding 24. In particular, voltage divider is provided between the series resistors 31 and 39 together with the resistance of the probe 35. In a like manner, a voltage divider is provided between the resistors 32 and 39 together with the resistance associated with the probe 38. It is also apparent, that the voltage at the junction points 33 and 34 will vary in accordance wih the variations in impedance experienced by the respective probes coupled thereto.

The amplifier stages utilized to sense the changing impedance associated with the probes 35 and 38 include a first pair of transistors 41 and 42 and a second pair of transistors 43 and 44. The transistor 41 has a base 45 coupled to the circuit junction point 33 and has a collector 46 coupled to a circuit junction point 47. The transistor 42 has its base 48 coupled to an emitter 49 of the transistor 41 and has its collector 50 coupled to the circuit junction point 47 and hence also to the collector 46 of the transistor 41. The emitter 51 of the transistor 42 is grounded at circuit junction point 52.

In a similar manner, the transistor 44 has its base terminal 53 coupled to the circuit junction point 34 and has its collector 54 coupled to a circuit junction point 55 and through a resistor 56 to the circuit junction point 47. The transistor 44 has its emitter 57 coupled to the base 58 of the transistor 43. The transistor 43 has its collector 59 coupled to the circuit junction point 55 and has its emitter 60 grounded as at 61.

A pair of diodes 62 and 63 are coupled to the circuit junction points 33 and 34, respectively, and have their anodes grounded as at 64 and 65.

A relay 66 is coupled from the circuit junction point 47 to a circuit junction point 67 and has a capacitor 68 coupled thereacross. A diode 69 is connected from the circuit junction point 67 to a circuit junction point 70 which is electrically identical to circuit junction points 29 and 30.

In operation, the closing of the switch 19 will energize the load 17 which in this case may be a device for pumping fluid into the container 36. As the level of fluid within the container 36 begins to rise, the impedance between the probe 35 as first sensed at the end portion 37 will suddenly be reduced thereby reducing the voltage at the circuit junction point 33. This reduction in voltage will turn off the transistor 41 and hence turn off the transistor 42. However, sufficient conduction will remain through the relay 66 by means of the transistors 43 and 44 to hold the relay on and hence hold the pump 17 in an operating state.

As the level of fluid within the container continues to rise, the impedance between the probe 38 and the tank 40 will likewise decrease thereby causing a decrease in the volage at the circuit junction point 34 thereby turning off the transistors 44 and 43 and hence turning off the relay 66.

As the fluid within the container 36 is consumed, and the level of the fluid therein falls below the level of the probe 38, the impedance between that probe and the tank 40 will suddenly increase thereby increasing the voltage at the circuit junction point 34 for turning on the transistors 44 and 43. However, due to the limiting action of the resistor 56, the current within the relay 66 will be insufficient to "pull in" the relay. Hence the pump 17 will not be energized.

However, as the level of fluid within the container 36 continues to fall, the impedance between the low point 37 of the probe 35 and the tank 36 will also increase thereby increasing the voltage at the circuit junction point 33 and hence turning on the transistors 41 and 42. The turning on of these transistors, together with the transistors 43 and 44 will then allow sufficient current to flow through the relay 66, thereby energizing the load 17.

It is apparent then, through the use of the separate amplifier stages which in turn are connected in series with the relay 66, a solid state switching device is employed for effectively regulating the level of fluid within the container 36 at two levels, a turn on, and a turn off level.

Referring to FIG. 2, a tank 71 may contain an ice bank 72 and a pair of probes 73 and 74. As ice builds up against a plate 75 and engulfs the first probe 73 a first signal may be generated at the circuit junction point 33 of FIG. 1 for turning off the first amplifier stage which includes the transistors 41 and 42. The device 17 which in this case would be a compressor is held on due to the conduction of the second amplifier stage. As the ice continues to build up and then engulfs the second probe 74, the second amplifier stage is turned off and hence the compressor is deactivated.

As the build up of ice recedes past the first probe 74, the second amplifier stage is placed in a conducting state. However, due to the limiting resistors 56, the conduction of the second amplifier stage will allow insufficient power to pass through the relay 66 for activating the same. However, as the elimination of ice continues, the first amplifier stage will also be placed in a conducting state, thereby allowing sufficient power to pass through the relay 66 for "pulling in" the same.

It is apparent, then, that value of the resistor 56 must be such as to allow sufficient current to pass through the relay 66 when the transistors 43 and 44 are operating to "hold in" the relay, but the resistor 56 must be of such value to prevent sufficient current from "pulling in" the relay 66 when only the transistors 43 and 44 are operating.

It is apparent that in the case of the build up of ice as shown in FIG. 2, that the ice will provide an increase in impedance rather than a decrease in impedance, and that the circuit of FIG. 2 must be so modified to respond to a negative rather than a positive voltage at the circuit junction points 33 and 34.

It will be also apparent that various modifications and combinations of my invention may be accomplished by those skilled in the art without departing from the spirit and scope thereof as disclosed herein, and I desire to claim all such modifications and combinations as properly come within the field of my invention.

I claim as my invention:

1. A circuit for controlling the actuator of a device to regulate the build up of a substance within a container comprising:
    switch means for connecting and disconnecting said device to and from an energy supply source,
    relay means for actuating said switch means,
    said container having a portion thereof from which the build up of said substance begins,
    first and second probes disposed within said container,
    said second probe being spaced further from said portion of said container than said first probe,
    first and second means for sensing the impedance associated with said first and second probes, respectively, each of said first and second sensing means having means for developing a separate signal within said relay means when the impedance of its associated probe reaches a specified magnitude,
    a relatively high impedance circuit coupling said first sensing means to said relay and a relatively low impedance circuit coupling said second sensing means to said relay,
    said high impedance circuit drawing sufficient current to hold said relay on but drawing insufficient current to energize said relay in the absence of conductor from said low impedance circuit.

2. A circuit in accordance with claim 1 wherein said first and second means for sensing the impedance associated with said first and second probes, respectively, comprises first and second solid state switching devices, first and second voltage dividers coupled to the inputs of said first and second solid state switching devices, respectively, and said first and second probes constituting one leg of said voltage dividers, respectively.

3. A circuit in accordance with claim 2 wherein each of said solid state switching devices are connected in series with said relay means.

4. A circuit in accordance with claim 3 wherein means are associated with one of said solid state switching devices to limit the current therethrough when said device is in an "on" state relative to the current carried by the other of said solid state switching devices when said other device is in an "on" state.

5. A circuit for controlling the actuation of a device to regulate the build up of a substance within a container comprising:
    a power source,
    first and second voltage dividers connected in parallel across said power source,
    each of said voltage dividers having a number of series connected resistors,
    one of said series connected resistors of each of said voltage dividers being a probe spaced from a wall portion of said container,
    a transistor amplifier stage coupled to each of said probes and in parallel with each other,
    said transistor amplifier stages being biased to be turned "on" and "off" due to changes in impedance associated with said probes,
    a relay for energizing said device,
    said relay being coupled to said power source and being connected in series with each of said transistor amplifier stages, the impedance path consisting of said relay and one of said transistor amplifier stages being greater than the impedance path consisting of said relay and the other of said amplifier stages.

6. A circuit in accordance with claim 5 wherein said power source bears such relation to the impedance of said relay as to deliver insufficient power to "pull in" said relay when only one of said transistor amplifier stages is turned "on" and as to deliver sufficient power to "hold in" said relay when either one of said transistor amplifier stages is turned "on."

7. A circuit in accordance with claim 5 wherein a diode is coupled in shunt relation to the input of each said transistor amplifier stages.

References Cited

UNITED STATES PATENTS

| | | | |
|---|---|---|---|
| 3,246,210 | 4/1966 | Lorenz | 307—116 X |
| 3,279,379 | 10/1966 | Klyce | 137—392 X |
| 3,298,191 | 1/1967 | Burke | 62—140 |
| 3,351,084 | 11/1967 | Halkiades | 137—392 X |

ROBERT K. SCHAEFER, Primary Examiner

T. B. JOIKE, Assistant Examiner

U.S. Cl. X.R.

62—139; 137—392; 317—148.5